June 22, 1926.
E. G. WEAVER
1,590,141
AIR PRESSURE GAUGE
Filed Dec. 22, 1924
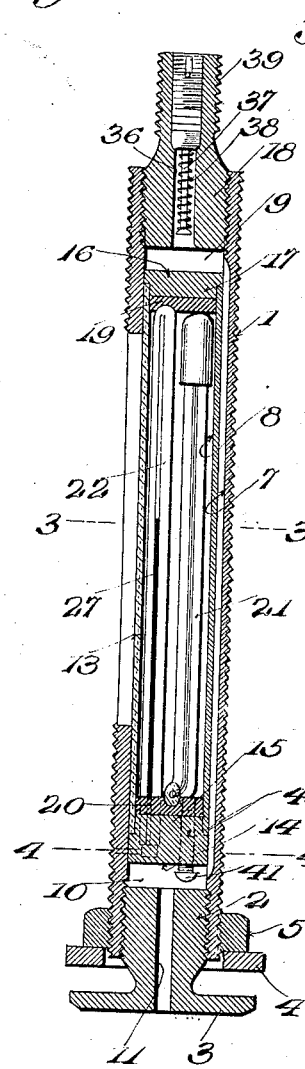
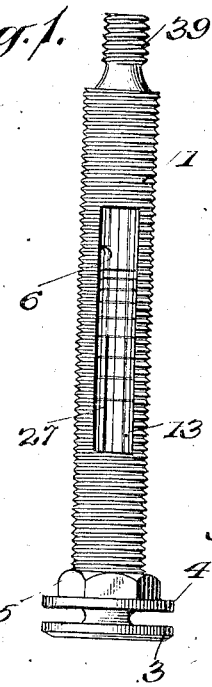
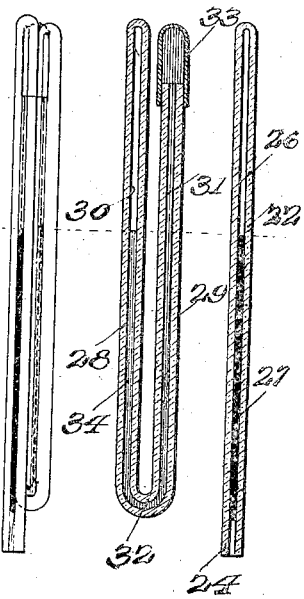
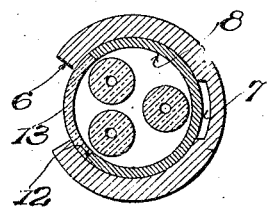
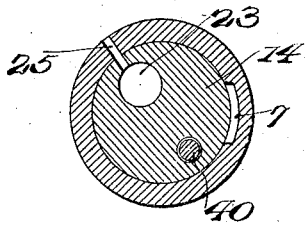
WITNESSES
INVENTOR
Edward G. Weaver
BY
ATTORNEYS Patented June 22, 1926.

1,590,141

UNITED STATES PATENT OFFICE.

EDWARD G. WEAVER, OF BUTTE, MONTANA.

AIR-PRESSURE GAUGE.

Application filed December 22, 1924. Serial No. 757,476.

This invention relates to a gauge for the valves of air containers, and more particularly to a valve stem used in connection with an automobile tire.

An object of the invention is the provision of a device which will indicate at all times the pressure in a container or tire to which it is connected.

Another object of the invention is the provision of a gauge forming part of the valve stem of an automobile tire valve through which the air is adapted to be forced for inflating the tire with the device functioning to constantly indicate the pressure of the tire.

A further object of the invention is the provision of a gauge applicable to the valve stem of an automobile tire valve for indicating constantly the pressure of the air in the tire and in which the indicating instrumentality includes a compensating means for temperature changes whereby the gauge will properly register.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a view in elevation of the complete assembly of the tire valve and gauge.

Figure 2 is a vertical section of the combined tire valve and gauge.

Figure 3 is a horizontal section taken along the line 3—3 of Figure 2.

Figure 4 is a horizontal section taken along the line 4—4 of Figure 2.

Figure 5 is a view of the indicating elements of the gauge removed from their support.

Figure 6 is a vertical section of the U-tube forming one of the elements of the gauge.

Figure 7 is a vertical section of an element of the gauge which compensates for temperature changes and cooperates with the U-tube in Figure 6 for determining the indication at a definite pressure.

Referring more particularly to the drawings 1 designates an externally threaded hollow barrel having its opposite ends internally threaded to receive at its inner end the threaded plug 2 of one clamping member 3 which cooperates with a washer 4 for locking the barrel 1 to an inner tube when the nut 5 engaging the external threads of the barrel 1 is forced down tight upon the washer 4.

Barrel 1 has a portion of its wall cut away to form an elongated sight window 6. At a point opposite the sight window 6 is formed a groove 7 on the inner wall of the barrel 1. This groove provides a passage for fluid between the outer wall of an air-tight cylinder 8 and the barrel 1 and connects a chamber 9 at the outer end of the barrel with a chamber 10 located at the inner end of said barrel.

A passage 11 in the plug 2 and clamping member 3 connects the chamber 10 with the interior of the inner tube of a tire.

The wall of the cylinder 8 is cut-away as shown at 12 to receive a curved window 13, the curvature of which conforms to the arc of a circle, the radius of which is equal to the radius of the inner wall of the cylinder 8. The window 13 closes the opening forming the sight window 6 in the barrel 1 and as will be seen in Figure 2 the member 13 extends the full length of the cylinder 8. The window is sealed in any approved manner to prevent the passage of air.

The inner end of the cylinder 8 is closed by a plug 14 having a boss 15 neatly fitted within the lower end of the cylinder 8 with the lower end of said cylinder resting upon a shoulder formed by the boss 15 and the main body of the plug 14. The body of the plug is of such a diameter that it will close the lower end of the barrel 1 above the plug 2 except for the passage 7. The upper end of the cylinder 8 is closed by a plug 16 having a boss 17 fitted within the upper end of the cylinder 8, the diameter of the plug being such that it closes the upper end of the barrel 1 and below the inner end of a valve cage 18. The plugs 14 and 16 close the opposite ends of the cylinder 8 thereby forming a substantially air tight chamber in said barrel. The plugs 14 and 15 are pressed into the barrel and form a tight fit to prevent the passage of air therearound.

A rubber cushion 19 seated on the inner end of the boss 17 cooperates with a rubber cushion 20 on the inner end of the boss 15 for maintaining the U-shaped gauge element 21 and the straight gauge element 22 in position and prevents breakage of the same. The cushion 20 is provided with an opening to receive the lower end of the element 22 which alines with a socket 23 in the plug 14 for receiving the lower end 24 of the element 22. A horizontal passage 25 formed through the wall of the barrel 1 and the plug 14 connects the pocket 23 and likewise the restricted bore 26 of the element 22 with the atmosphere.

The bore 26 of the element 22 has a column of colored glycerine 27 therein which is normally colored black for a purpose to be presently described.

The U-tube 21 as shown more particularly in Figure 6 is provided with two legs 28 and 29, each having a bore respectively designated as 30 and 31 and connected at their lower ends as shown at 32. The upper end of the leg 28 is closed while the bore 31 of the leg 29 is sealed by a bulb 33. The bulb is made of flexible material which may be expanded or contracted by either internal or external pressure. The U-tube 21 is partially filled with a column of glycerine 34 colored red to distinguish it from the column 27. The normal level of both liquids is indicated by a line designated by the numeral 35. The bulb 33 acts as a well and contains red glycerine which is in communication with the column of glycerine in leg 29.

The valve cage 18 is provided with a central bore 36 in wihch is mounted a valve stem 37. A spring 38 maintains the valve upon its seat. A threaded nipple 39 is adapted to receive the dust cap or a union connected with the flexible conduit of an air tank.

The threaded passage 40 is formed in the plug 14 and into which is adapted to be screwed a threaded stud 41 which will permit a restricted quantity of air to be admitted to the air-tight cylinder 8 to insure a gradual and steady increase of pressure within container 8 during inflation, thereby protecting the bulb or well 33 against sudden impact of air which would otherwise occur when a hose containing high pressure is attached at the nipple 39. The cushion 20 is also shown with an opening alining with the passage 40.

The operation of my device is as follows:
Air is applied through the nipple 39 into chamber 9 whence the air under pressure passes through the conduit 7 into chamber 10 through passage 11 into the inner tube (not shown). Since the cylinder 8 is airtight except for the restricted passage between the threaded stud 41 and the perforation 40 only a small quantity of the air will be forced into said cylinder. Pressure on the bulb 33 will force the column of red glycerine up in the bore 30 of the leg 28 of the U-tube 31 and the top of said column will be located approximately at the line 35 in Figure 6 for a pressure of 50 pounds and at a temperature of 70 degrees. For the same temperature the column 27 of black glycerine will also stand at the line designated by the numeral 35.

When the temperature changes or is raised the air in the upper end of the registering element 22 will force the column of glycerine 27 downwardly and the expansion of the air in the bore 30 due to an increase of temperature will also force the column 34 downwardly. Nevertheless when the upper ends of the column are in the same horizontal plane the registering device will indicate the pressure of 50 pounds as before. The lower end of the tube 22 is open to the atmosphere so that changes in the temperature will cause variation in the position of the upper end of the column of glycerine in said tube.

It must also be borne in mind that the device can be so graduated in order to determine any other pressures within a reasonable limit for air in the inner tube. Furthermore while I have described the device as operating under the pump it is to be understood that the device will indicate at all times the pressure in the tire since the tire is in communication through passage 11 with the indicating device.

What I claim is:

1. An air pressure gauge comprising a barrel, a substantially air-tight container within the barrel, a U-tube formed of glass and having a restricted bore, one leg of the tube being open, a flexible bulb connected with the open end and adapted to be contracted by air pressure in the container, a column of liquid in the bore adapted to be elevated in the closed leg of the tube to a predetermined point for a definite pressure in the container, the closed leg having a column of air above the column of liquid, a second glass tube provided with a bore and an indicating liquid in the bore, said second tube having a column of air above the column of liquid, the upper end of the column of liquid in the closed leg of the U-tube registering with the upper end of the column of liquid in the second tube at a predetermined pressure in the barrel regardless of the temperature.

2. An air pressure gauge comprising a barrel, a substantially air-tight container within the barrel, a U-tube formed of glass and having a restricted bore, one leg of the tube being open, a flexible bulb connected with the open end and adapted to be contracted by air pressure in the container, a column of liquid in the bore adapted to be elevated in the closed leg of the tube to a predetermined point for a definite pressure in the container, the closed leg having a column of air above the column of liquid, a second glass tube provided with a bore and an indicating liquid in the bore, said second tube having a column of air above the column of liquid, the upper end of the column of liquid in the closed leg of the U-tube registering with the upper end of the column of liquid in the second tube at a predetermined pressure in the barrel regardless of the temperature, the lower end of the container and the barrel being provided with communicating passages open to the atmosphere, said passages being in communication with the lower end of the second indicating tube to permit lowering of the column of liquid when the air in said tube expands due to a rise in temperature.

3. An air pressure gauge comprising a barrel, a substantially air-tight container within the barrel, a U-shaped tube having a restricted bore, one leg of the tube being open, a flexible bulb connected with the open end of the leg and adapted to be contracted by air pressure in the container, a liquid column in the bore adapted to be elevated in the closed leg when the bulb is contracted, said U-shaped tube being transparent, and means affected by variations in temperature and cooperating with the liquid column in the U-shaped tube for indicating the pressure in the barrel for a predetermined degree.

4. An air pressure gauge comprising a barrel, a substantially air-tight container within the barrel, a U-shaped tube having a restricted bore, one leg of the tube being open, a flexible bulb connected with the open end of the leg and adapted to be contracted by air pressure in the container, a liquid column in the bore adapted to be elevated in the closed leg when the bulb is contracted, said U-shaped tube being transparent, and means affected by variations in temperature and cooperating with the liquid column in the U-shaped tube for indicating the pressure in the barrel for a predetermined degree, a window in the barrel for inspecting the position of the liquid column in the U-shaped tube, said container and barrel having a restricted communication therebetween to permit air under pressure to enter the container.

5. An air pressure gauge comprising a barrel, a substantially air-tight container within the barrel, a U-shaped tube having a restricted bore, one leg of the tube being open, a flexible bulb connected with the open end of the leg and adapted to be contracted by air pressure in the container, a liquid column in the bore adapted to be elevated in the closed leg when the bulb is contracted, said U-shaped tube being transparent, and means affected by variations in temperature and cooperating with the liquid column in the U-shaped tube for indicating the pressure in the barrel for a predetermined degree, said container being neatly fitted within the barrel to provide chambers at the opposite ends of the barrel, the inner wall of the barrel being provided with a groove running longitudinally thereof for placing the chambers in communication with each other, one of the chambers being adapted to be placed in communication with an external pressure.

6. An air pressure gauge comprising a barrel, a substantially air-tight container within the barrel, a U-shaped tube having a restricted bore, one leg of the tube being open, a flexible bulb connected with the open end of the leg and adapted to be contracted by air pressure in the container, a liquid column in the bore adapted to be elevated in the closed leg when the bulb is contracted, said U-shaped tube being transparent, a straight transparent tube provided with a restricted bore, the upper end of the bore being closed, the lower end being in communication with the atmosphere, a liquid column in the bore adapted to be affected by temperature changes whereby the column is elevated or lowered, the column of liquid in the closed leg of the U-shaped tube being of such a length that its upper end will be normally in the same plane with the upper end of the liquid column in the straight tube for a definite pressure in the barrel, said barrel and container being in restricted communication, said barrel adapted to be placed in communication with an external air pressure.

EDWARD G. WEAVER.